United States Patent [19]
Tanaka et al.

[11] 4,080,425
[45] Mar. 21, 1978

[54] ELIMINATION OF NITROGEN OXIDES FROM EXHAUST GASES WITH NITRILES

[75] Inventors: Tetsuo Tanaka; Tadatsugu Yamamoto; Yasuo Takahashi; Hideaki Obana; Kunio Watanabe; Kunihiko Wada; Kunihiko Yamashita; Kusuo Ohki, all of Kurashiki, Japan

[73] Assignee: Asahi Kasei Kogyo Kabushiki Kaisha, Osaka, Japan

[21] Appl. No.: 690,134

[22] Filed: May 26, 1976

[30] Foreign Application Priority Data

May 26, 1975 Japan .................................. 50-61875

[51] Int. Cl.² .......................................... C01B 21/00
[52] U.S. Cl. .................................... 423/235; 423/236; 423/245; 423/351
[58] Field of Search ............... 423/235, 236, 245, 239, 423/351

[56] References Cited

U.S. PATENT DOCUMENTS

| 3,599,427 | 8/1971 | Jones et al. | 423/213.7 |
| 3,846,981 | 12/1974 | Paczkowski | 423/235 |
| 3,867,507 | 2/1975 | Myerson | 423/235 |
| 3,900,554 | 8/1975 | Lyon | 423/235 |
| 3,988,423 | 10/1976 | Ohrui et al. | 423/239 |

FOREIGN PATENT DOCUMENTS

| 962,613 of | 1904 | United Kingdom | 423/236 |
| 276,347 | 2/1929 | United Kingdom | 423/236 |

*Primary Examiner*—O. R. Vertiz
*Assistant Examiner*—Eugene T. Wheelock
*Attorney, Agent, or Firm*—Sughrue, Rothwell, Mion, Zinn and Macpeak

[57] ABSTRACT

An exhaust gas containing nitrogen oxides is efficiently purified without the necessary use of catalysts by contacting the exhaust gas with a nitrile compound at high temperature in the presence of oxygen, whereby the nitrogen oxides and the nitrile compound are selectively decomposed into harmless materials.

17 Claims, 11 Drawing Figures

ELIMINATION OF NITROGEN OXIDES FROM EXHAUST GASES WITH NITRILES

BACKGROUND OF THE INVENTION

1. Field of the Invention

The present invention generally relates to a method of decomposing nitrogen oxides in an exhaust gas into harmless materials.

2. Description of the Prior Art

With industrial developments, pollution problems have received great attention from the viewpoint of environmental conservation. With regard to air pollution, materials other than the normal components of air, such as sulfur oxides and smoke dust, as well as nitrogen oxides, hydrocarbons, and fluorocarbons (which were considered to be inactive materials) are now considered to be harmful materials which cause air pollution. Thus, in industry, it is required to exhaust industrial waste gases after purifying the waste gases or after converting harmful materials contained in the waste gases into harmless materials (e.g., nitrogen, oxygen, water, and carbon dioxide).

Under these circumstances, the decontamination of exhaust gases containing nitrogen oxides has encountered various problems in establishing technology therefor which is economical.

In general, as nitrogen oxides, there are various kinds of nitrogen compounds, such as nitrogen dioxide which shows strong toxicity, and stable nitrogen monoxide, but since at high temperature combustion nitrogen monoxide exists in a stable state, nitrogen oxides exist almost entirely as the state of nitrogen monoxide in combustion gases.

As purification methods for exhaust gases containing nitrogen monoxide, a wet method, a dry method, etc., have been proposed, but since nitrogen monoxide is a stable product, an effective purification technique therefor has not yet been established.

That is, in conventional purification methods, there are various problems, e.g., in the wet method, treatment of the waste solution used in the wet method is additionally required, and in the dry method, which employs a catalyst, the life of the catalyst is greatly influenced by sulfur compounds and dust contained in the exhaust gas. Among these purification methods, non-catalytic dry methods of removing nitrogen oxides have been proposed by Myerson in Japanese Patent Application (Laid Open) 47,244/74 and Lyon in Japanese Patent Publication 35,908/75 and are noticeable techniques from the viewpoint of the cost of equipment and the economy of operation.

A combustion exhaust gas contains generally, as a component thereof, about 0.3 to about 10% by volume of oxygen since a larger amount of air than that required for burning fuels is supplied to a combustion zone. On the other hand, the content of nitrogen oxides in the combustion exhaust gas is about 50 to about 10,000 ppm by volume (hereinafter only referred to as "ppm"), even more generally 80 to 2,000 ppm.

When such a combustion exhaust gas containing a large amount of oxygen is treated by the method proposed by Myerson, a large amount of a reducing agent is inevitably consumed by reaction with oxygen since the reaction rate of the reducing agent and oxygen is higher than the reaction rate of the reducing agent and nitrogen oxide. On the other hand, when the combustion exhaust gas is treated by the method proposed by Lyon, the consumption of the reducing agent may be small since the reaction of the reducing agent and nitrogen oxides selectively proceeds faster than the reaction of the reducing agent and oxygen, but the treatment is accompanied by the faults that the reaction temperature range employed is narrow and, in order to enlarge the reaction temperature range, a large amount of reducing agent including hydrogen, hydrocarbons, etc., must be used.

Furthermore, if in the case of using ammonia as the reducing agent the ammonia is exhausted from the system in the unreacted state, there is the possibility of secondary pollution, and, further, in a system where the exhaust gas contains sulfur oxides, the combustion system may encounter clogging problems due to the deposition of ammonium hydrogen sulfate. In general, the oxidative decomposition of ammonia is carried out at high temperatures in the presence of catalyst. Thus, it is difficult to decompose unreacted ammonia in a non-catalytic system or the use of catalyst is inevitable in such a system, which causes the aforementioned troubles.

SUMMARY OF THE INVENTION

Under such circumstances, the inventors performed intensive research, and, as a result thereof, discovered that when the decomposition reaction of nitrogen oxides is carried out using a nitrile compound as the reducing agent, the selective reduction of nitrogen oxides proceeds over a wide temperature range, and, further, the nitrile compound used as the reducing agent is also decomposed into harmless materials in this treatment.

According to this invention, there is thus provided a method of purifying an exhaust gas containing nitrogen oxides which comprises contacting the exhaust gas with a nitrile compound in the presence of oxygen at a temperature range of about 500° to about 1,000° C to decompose the nitrogen oxides and the nitrile compound into harmless materials.

DETAILED DESCRIPTION OF THE INVENTION

In the method of this invention, a nitrile compound is used as a reducing agent. The nitrile compound is a hydrocarbon compound having at least one CN group (nitrile group). Examples of the nitrile compounds used in this invention include saturated aliphatic nitriles such as acetonitrile, propionitrile, butyronitrile, etc., unsaturated aliphatic nitriles such as acrylonitrile, methacrylonitrile, crotononitrile, etc., saturated aliphatic polynitriles such as malonitrile, succinonitrile, adiponitrile, etc., unsaturated aliphatic polynitriles such as fumaronitrile, maleonitrile, etc., and aromatic nitriles such as benzonitrile, tolunitrile, benzyl cyanide, etc. These nitrile compounds may be used individually or as a mixture thereof. Of these nitrile compounds, acetonitrile is most preferable from an economical standpoint.

In the practice of the method of this invention, it is required that an exhaust gas containing nitrogen oxides be brought into contact with one or more nitrile compounds (hereafter the singular is generally used for purposes of brevity) at a temperature in the range of about 500° to about 1,000° C.

If the reaction temperature is lower than about 500° C, the decomposition reaction hardly occurs, while if the reaction temperature is over about 1,000° C, the nitrile compound itself is oxidized to form nitrogen oxides. In order to obtain the high purification ratio of the nitrogen oxides and the nitrile compound of more than 80%, the reaction temperature is preferably from 600° C to 900° C.

The amount of the nitrile compound used in this invention for reducing the content of nitrogen oxides is more than about 0.5 mol, preferably 0.8 to 5 mols, per mol of nitrogen oxides in the exhaust gas, and when a nitrile compound having two or more nitrile groups is used, the number of mols of the nitrile compound used may be converted into the molar number of the nitrile groups.

If the amount of the nitrile compound is less than about 0.5 mol, a sufficient purification ratio of nitrogen oxides is not obtained, while if the amount thereof is larger than 5 mols, such an amount is over the necessary amount as a reducing agent, as shown in Example 3, as well as the purification of the nitrogen oxides and the nitrile compounds may be inhibited depending upon the reaction temperature, which results in secondary pollution.

Since a nitrile compound itself is a material causing air pollution, it is required to select reaction conditions such that the nitrile compound is decomposed into water, carbon dioxide and nitrogen after reducing the nitrogen oxides. In order to achieve this purpose, it is necessary to perform the reaction in the presence of oxygen. The preferred amount of oxygen is over about 0.3% by volume based on the total volume of gases.

More practically, when the decomposition reaction of nitrogen oxides is carried out in the absence of oxygen, not only the decomposition reaction of the nitrile compound but also the reduction reaction of nitrogen oxides are greatly obstructed as shown in Comparison Example 1. As is set forth below in Examples 3 and 4, the decomposition reaction of nitrogen oxides is effected by the composition of the exhaust gas, the reaction temperature and the residence time. Accordingly, considering the composition of the exhaust gas, the reaction temperature and the residence time, the decomposition reaction must be carried out in the presence of a sufficient amount of oxygen. In general, since about 0.3 to about 10% by volume of oxygen is contained in the exhaust gas, the exhaust gas can be treated as it is. Depending upon the composition of the exhaust gas, it is sometimes required to supply shortage oxygen. In this case, air or oxygen per se can be introduced into the reaction system as the oxygen source, but the oxygen source used in this invention is not limited thereto. When the concentration of oxygen exceeds 10% by volume this does not cause any inhibition, but it is preferred from an economical standpoint that the concentration of oxygen be not more than 10% by volume.

The residence time required in this invention is longer than about 0.1 second, preferably longer than 0.5 second. The longer the residence time, the better the results obtained. But, it is preferred, from an economical standpoint, that the residence time be not more than about 5 seconds.

The method of this reaction may be carried out at reduced pressure, a normal pressure, or high pressure. But it is preferred, from an economical standpoint, to carry out the reaction at an absolute pressure of about 0.5 to about 2.0 atms. However, it is to be noted that the pressure employed is not limited thereto.

Examples of exhaust gas treatable by the method of this invention are exhaust gases containing nitrogen oxides, more specifically, a so-called clean gas such as an exhaust gas from a nitric acid manufacturing factory, a so-called dirty gas such as an exhaust gas from a heavy oil boiler, and a gas containing hydrocarbons and oxygen containing hydrocarbons such as an exhaust gas from an acrylic acid manufacturing factory. Exhaust gases containing water, carbon dioxide, sulfur oxides and the like can also be treated by the method of this invention. Examples of the hydrocarbons are aliphatic saturated hydrocarbons such as methane, ethane, etc.; aliphatic hydrocarbons such as acetylene, ethylene, butadiene, etc.; and aromatic hydrocarbons such as benzene, etc. Also, examples of the oxygen containing hydrocarbons are alcohols such as methyl alcohol, ethyl alcohol, etc.; aldehydes such as formaldehyde, acetaldehyde, etc.; ketones such as acetone, methyl ethyl ketone, etc.; carboxylic acids such as formic acid, etc.; ethers such as methyl ether, etc.; esters; and carbon monoxide.

Also, since the feature of this invention lies in the point of treating an exhaust gas containing nitrogen oxides in the presence of a nitrile compound, an exhuast gas containing a nitrile compound together with nitrogen oxides and an exhaust gas containing a nitrile compound, which has been partially burned beforehand, may be used in the method of this invention.

Hitherto, for treating nitrile compounds, methods the same as were used for treating hydrocarbons have been employed, and an incineration method or an oxidative decomposition using a catalyst have been proposed. However, in these conventional methods, nitrogen oxides form according to the conditions employed, which results in requiring a further purification step of the nitrogen oxides. On the other hand, it has been astonishingly found that by treating the exhaust gas according to the method of this invention, the nitrogen oxides and nitrile compounds can be simultaneously decomposed into harmless materials.

When a nitrile compound is subjected to combustion using an incinerator, a flame is inevitable formed by the combustion thereof in the incinerator to locally form a high temperature zone of higher than 1,000° C, and the nitrile compound is decomposed in the high temperature zone of the flame to form nitrogen oxides. Thus, even when the mean temperature of the incinerator is in the range of about 500° to about 1,000° C, the formation of nitrogen oxides is inevitable as the result of the formation of such a local high temperature zone. Thus, it has been found that by performing the combustion at a temperature range of about 500° to about 1,000° C while avoiding the occurrence of a local high temperature zone due to the flame, etc., nitrile compounds can be decomposed into harmless materials without being accompanied by the formation of nitrogen oxides.

Furthermore, from the fact that nitrile compounds have the facility to selectively reduce nitrogen oxides, it has been verified that even when nitrile compounds in the exhaust gas are partially converted into nitrogen oxides by contact with the high temperature flame, the nitrogen oxides thus formed are reduced into harmless materials by treating the nitrogen oxides in the gas with the remaining nitrile compounds in the exhaust gas at a temperature of about 500° to about 1,000° C, which results in purifying nitrile compounds without the formation of nitrogen oxides.

An exhaust gas containing nitrile compounds usually further contains hydrocarbons and oxygen containing hydrocarbons together with the nitrile compounds, and, in such case, it must be kept in mind that the temperature of the system should not exceed about 1,000° C as a result of burning or combustion. In one method of practicing the above mentioned technique, the stream of the exhaust gas is divided into two or more streams, one stream is burned using a combustion improver, then other stream(s) is/are introduced into the combustion zone successively to control the temperature of the combustion zone by the latent heat or the gas streams thus introduced, and, at the same time, to control the temperature of the combustion zone by reducing the partial pressure of the combustible gas, whereby the combustion can be carried out in the desired temperature range. Also, in another method, the stream of exhaust gas is divided into two or more streams, one stream of the exhaust gas is subjected to combustion using a catalyst layer in place of using a combustion improver and then the other stream or streams is/are successively introduced into the combustion zone to control the temperature of the combustion system at the desired temperature. As a result, the consumption of the combustion improver used can be reduced, which results in providing a more economically advantageous exhaust gas treatment. Moreover, by increasing the number of streams of exhaust gas, the consumption of the combustion improver can also be reduced. Therefore, it is preferred that the number of streams of exhaust gas to set taking into consideration the running cost for the exhaust gas treatment and construction costs for providing the treatment apparatus.

When the concentration of nitrile compound in the exhaust gas is high, a higher purification ratio can be obtained by increasing the reaction temperature, or by increasing the residence time of the nitrile compound, or further increasing the concentration of oxygen so that the unreacted nitrile compound does not remain.

Furthermore, when the exhaust gas contains hydrocarbons or oxygen containing hydrocarbons, the decomposition reaction proceeds over a wide temperature range as shown in Example 8.

The combustion improver used in this case includes materials generally used as fuels and examples of combustion improvers are liquid fuels such as heavy oil, kerosene, light oil, benzene, etc., and gaseous fuels such as town gas, liquefied natural gas, gases by-produced in petrochemical plants, etc.

As the catalyst employed in the aforesaid case, any catalyst conventionally used as oxidation catalyst may be used. Examples of the catalyst used are noble metal catalysts such as a platinum catalyst, etc., and catalysts composed of one or more oxides of nickel, chromium, cobalt, iron, vanadium, cooper, and silver. In this case, a platinum catalyst is most preferably used since the catalyst shows high activity even at low temperatures and has excellent heat resistance.

It is, as a matter of course, necessary that the temperature of the catalyst layer be higher than the oxidation reaction initiation temperature of the exhaust gas, but it is important that the catalyst layer be used at a temperature below the heat resistance temperature at which the activity of the catalyst lowers, which is accompanied by changes in the composition and structure of the catalyst. For example, when a platinum catalyst is used, it is desirable to carry out the reaction at about 100° to about 800° C, preferably 150° to 750° C. The space velocity of an exhaust gas passing through the catalyst layer is preferably in the range of about 10,000 to about 100,000 $hr^{-1}$, but is not limited to the range. Also, the reaction may be carried out at reduced pressure, normal pressure, or under pressure.

Practical examples of sources generating exhaust gases treatable by the method of this invention are a boiler plant, a diesel plant, a petrochemical plant, a heating furance, an iron works, a nitric acid manufacturing factory, an industrial furnace or a kiln in a cement factory, a factory producing acrylic acid, a factory producing acrylonitrile, a factory producing nitrile compounds, equipment using or treating nitrile compounds, fumigation equipment, etc., but the source of the exhaust gas used in this invention is not limited to them.

The invention will now be further illustrated more practically by the following Examples. In all Examples, each component was measured according to the following respective methods:

Nitrogen oxide: chemiluminescence method
Acetonitrile and other nitrile compounds: gas chromatography method
Hydrogen cyanide: pyridine-pyrazolone method
Ammonia: Nessler's method
Propylene: gas chromatography method
Propane: ditto
Carbon monoxide: ditto
Oxygen: ditto

EXAMPLE 1

Figure 1:
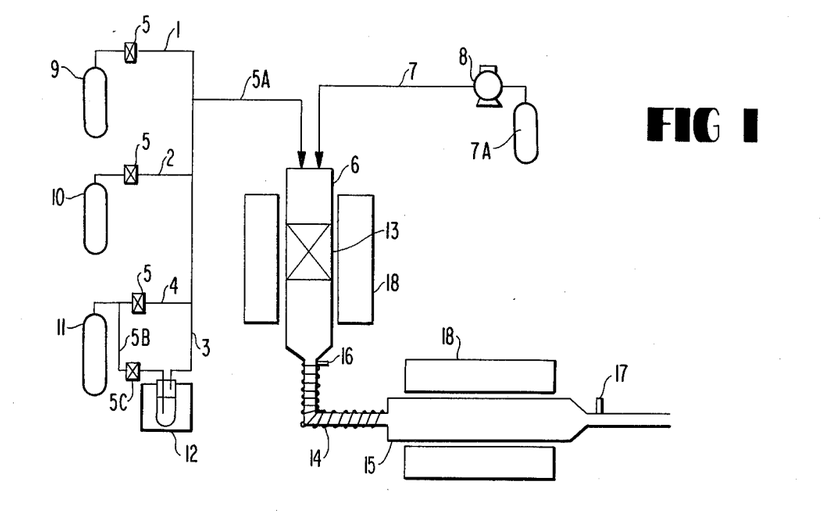
FIG. 1 is a schematic view showing one embodiment of the method of this invention.

The reaction in this Example was carried out using the apparatus illustrated in FIG. 1. In FIG. 1, numerals 1, 2, 3 and 4 show, respectively, inlets for an exhaust gas to be treated, air, a nitrile compound carried in nitrogen gas, and nitrogen gas, each of which is introduced into a preheating tube 6 via flow meter 5 and inlet 5A. Line 5B represents a conduit for the nitrogen gas from conduit 4 and introducing the same via flow meter 5C into the carburator 12 which is maintained at a predetermined temperature, the nitrogen gas sweeping the nitrile compound thereafter into conduit 3. Numeral 7 indicates an inlet for water which is introduced into the preheating tube 6 from cylinder 7A through constant flow pump 8. Numerals 9, 10 and 11 represent, respectively, a standard gas cylinder of nitrogen containing 5% by volume of nitrogen monoxide (exhaust gas to be treated), an air cylinder and a nitrogen gas cylinder. Preheating tube 6 is composed of Pyrex glass and had an inner diameter of 33 mm and a length of 55 cm, and is provided with a preheating zone 13 in which 100 ml of Raschig rings having a size of 6 mm was packed. The outlet of the preheating tube 6 is enclosed by a ribbon heater 14 and connected to a reaction tube 15. Outlets 16 and 17 for sampling were provided at the inlet and the outlet of the reaction tube 15, respectively. Both of the preheating tube and the reaction tube were disposed in electric furnaces 18 having a length of 40 cm.

Figure 2:
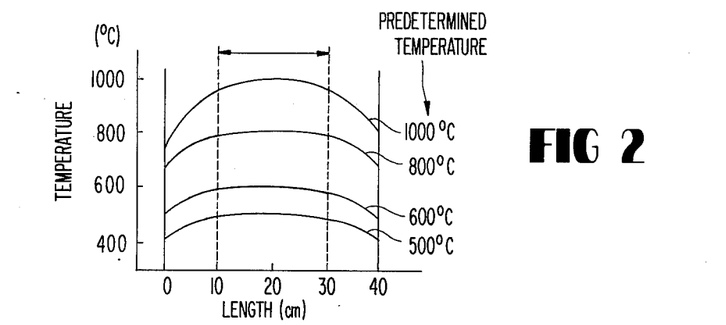
FIG. 2 illustrates the temperature distribution inside the reaction tube.

As a result of measuring the temperature distribution inside the reaction tube 15, as shown in FIG. 2, when the temperatures were preliminarily set at 1,000° C, 800° C, 600° C and 500° C, respectively, the length of the actual reaction zone of the reaction tube 15 was determined to about 20 cm. (In FIG. 2, the ordinate shows the temperature and the abscissa shows the length of the electric furnace.) In the apparatus as described previously, a quartz tube having an inner diameter of 40 mm and a length of 50 cm was employed as the reaction tube 15 (actual reaction zone length = 20 cm, as indicated).

The exhaust gas to be treated was introduced via line 1 from cylinder 9 at a rate of 15 to 16 ml/min, air was introduced via line 2 from cylinder 10 at a rate of 950 to 970 ml/min, nitrogen containing 3.4% by volume of acetonitrile (which was employed as the nitrile compound and which was kept at 0° C by means of the carburator 12) was introduced at a rate of 10 to 110 ml/min, and nitrogen gas was introduced via line 4 at a rate of 2,400 to 2,500 ml/min, all components being introduced into preheater 6 via line 5A. The water was introduced into preheater 6 via line 7 at a rate of 18 to 19 ml/hr. The system was substantially at atmospheric pressure. Thus, at the sampling outlet 16 of the reaction tube a gas having a composition of 200 to 210 ppm nitrogen monoxide, 5 to 6% oxygen and 100 to 980 ppm acetonitrile was obtained. This resulting gas was introduced into the reaction tube 15 in which reaction was carried out.

Figure 3:
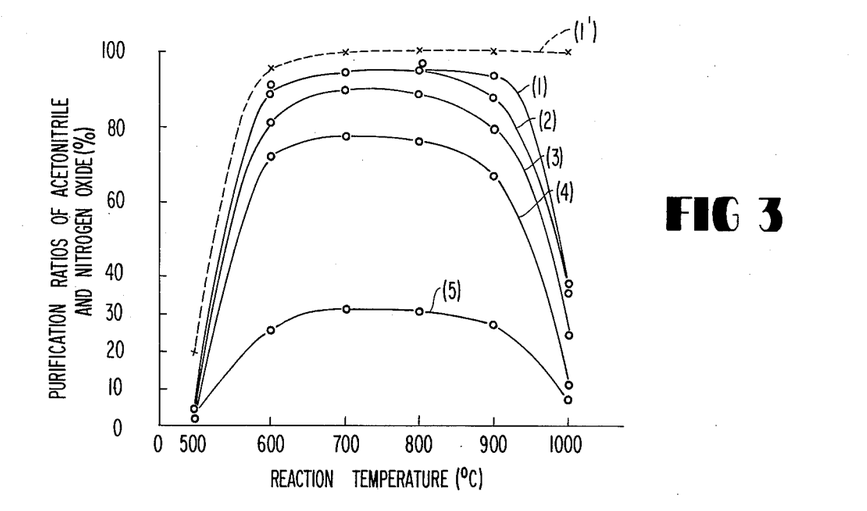
FIG. 3 is a graph showing the relationship between the reaction temperature and the purification ratios of nitrogen oxides and a nitrile compound using the concentration of acetonitrile as the parameter.

In this case, the purification ratio of the nitrogen oxide when the temperature in the reaction zone was changed from 500° C to 1,000° C was as shown in FIG. 3. In FIG. 3, curves (1), (2), (3), (4) and (5) stand for the purification ratios of nitrogen oxide when the concentration of acetonitrile was 980 ppm, 520 ppm, 300 ppm, 220 ppm and 100 ppm, respectively. Curve (1)' stands for the purification ratio of acetonitrile when the concentration of acetonitrile was 980 ppm. The residence time in the reaction zone was calculated as 1.0 ± 0.05 second at a temperature of 800° C.

From the fact that a reduction of nitrogen monoxide occurred in the presence of oxygen, it is clear that a selective reduction by acetonitrile occurred. That is, if acetonitrile reacted with oxygen, about 1.8% acetonitrile was required for 5% oxygen, but in the case of Example 1, the amount of acetonitrile used was merely 100 to 1,000 ppm. This shows that acetonitrile selectively reduced the nitrogen oxide.

The purification ratio in this Example was determined by the following equation (hereinafter applicable to the case where the apparatus shown in FIG. 1 was used);

Purification ratio = $(1 - A/B) \times 100$ (%)

wherein A is the concentration of the objective component at sampling outlet 17 and B is the concentration of the objective component at sampling outlet 16 of the reaction tube 15.

Also, it is clear that the purification reaction of the nitrogen oxide occurred at about 500° to about 1,000° C, and the nitrile compound itself (which was the reducing agent) showed a purification ratio greater than that of the nitrogen oxide. As is clear from the results given in FIG. 3, it is necessary to carry out the reaction at 600° to 900° C to obtain a high purification ratio of the nitrile compound.

EXAMPLE 2

The reaction apparatus used in Example 1 was employed in this Example for purifications using, as the nitrile compounds, propionitrile, acrylonitrile, malonitrile and benzonitrile.

In the case of propionitrile the concentration was set at 1.6% by volume (balance nitrogen) while keeping the carburator 12 at 0° C; in the case of acrylonitrile the concentration was set at 4.3% by volume (balance nitrogen) while keeping the carburator 12 at 0° C; and in the case of benzonitrile the concentration was set at 2% by volume while keeping the carburator 12 at 80° C. Moreover, in the case of malonitrile a 1% by weight aqueous solution thereof was used as the source of malonitrile. The gaseous mixture was introduced into the reaction zone while controlling the rates so that the contents of nitrogen monoxide, oxygen, and water were 250 to 280 ppm, 3%, and 10%, respectively, and the molar number of the nitrile groups of the nitrile compound was about twice that of nitrogen monoxide. The results are shown in Table 1.

TABLE 1

| Reducing Agent | Reaction Temp. (° C) | Residence Time (sec) | Purification Ratio of NO (%) | Purification Ratio of Nitrile Comp. (%) |
|---|---|---|---|---|
| Propionitrile | 700 | 0.5 | 80 | 100 |
| " | 800 | 0.5 | 90 | 100 |
| " | 800 | 1.0 | 94 | 100 |
| " | 900 | 0.5 | 92 | 100 |
| Acrylonitrile | 750 | 1.0 | 90 | 100 |
| Malonitrile | 800 | 0.5 | 78 | 100 |
| Benzonitrile | 800 | 0.5 | 90 | 100 |

From the results shown in Table 1, it can be understood that nitrile compounds have the function of selectively reducing nitrogen oxides.

EXAMPLE 3

The same procedure as in Example 1 was followed using acetonitrile as the reducing agent.

The purification reaction was carried out while changing the molar ratio of acetonitrile and nitrogen monoxide at reaction temperatures of 750° C and 900° C. The results are shown in the graph of FIG. 4.

Figure 4:
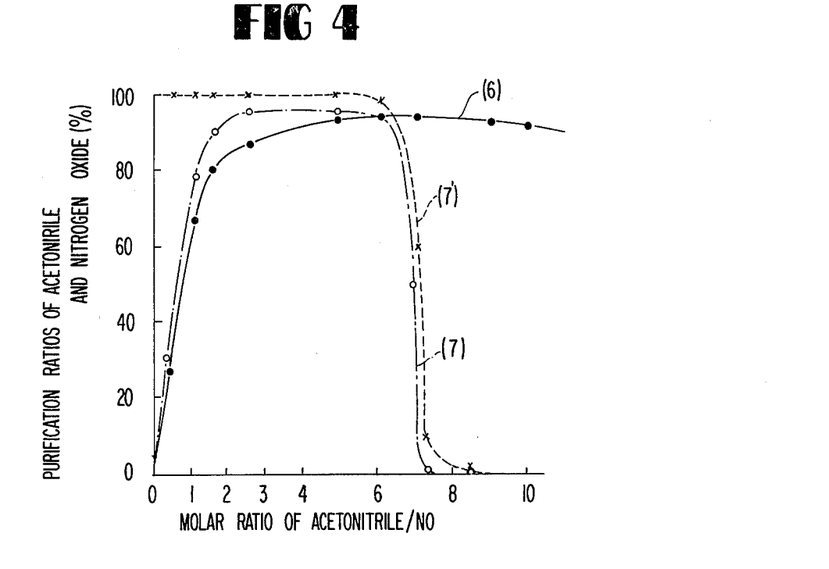
FIG. 4 is a graph showing the influences of the molar ratio of acetonitrile to nitrogen oxides on the purification ratios of nitrogen oxides and the nitrile compound.

In the graph of FIG. 4, curves (6) and (7) stand for the purification ratio of the nitrogen oxide at 900° C and 750° C, respectively, and curve (7') stand for the purification ratio of acetonitrile at 750° C. In the reaction, the rates of the feed gases were controlled so that the oxygen concentration, the residence time, and the concentration of nitrogen monoxide were 3.7%, 1.0 second, and 200 ppm, respectively.

As is shown by curve (7), the decomposition of nitrogen oxide was not observed when the molar ratio of the nitrile compound to nitrogen monoxide was above 7, and, in this case, the decomposition of acetonitrile did not occur as shown by curve (7').

The results of FIG. 4 show that the optimum molar ratio of nitrile compound to nitrogen monoxide is about 2 to about 3 and that when the molar ratio was increased, the reducing power for nitrogen oxides becomes lower, as well as the decomposition of the nitrile compound does not occur.

EXAMPLE 4

The influence of oxygen was determined using the reaction system of Example 1.

Figure 5:
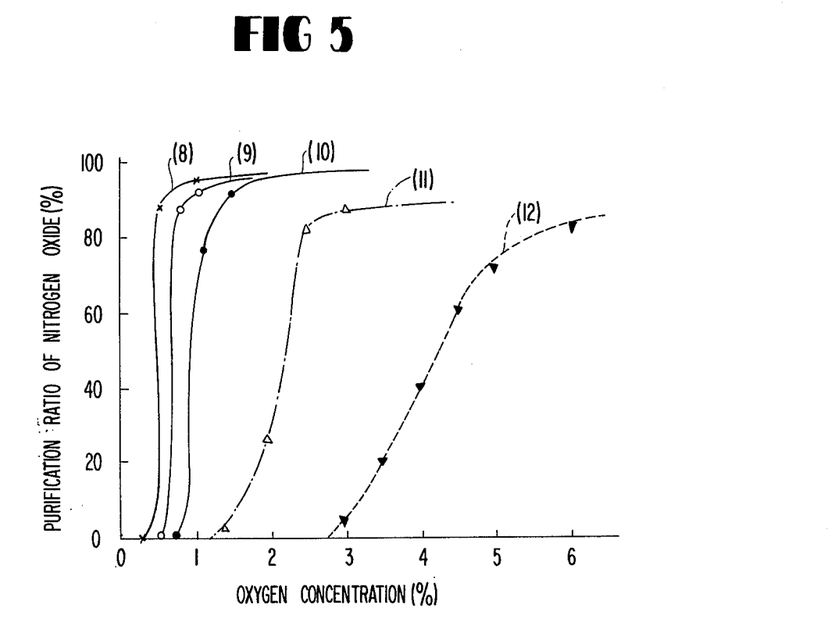
FIG. 5 is a graph showing the influence of the concentration of oxygen on the purification ratio of nitrogen oxides.
Figure 6:
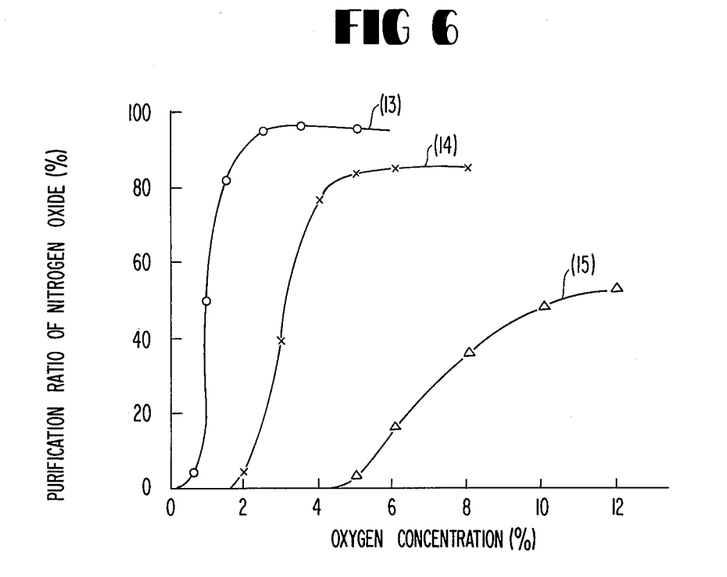
FIG. 6 is a graph also showing the influence of the concentration of oxygen on the purification ratio of nitrogen oxides.

The results obtained by performing the test at a reaction temperature of 900° C are shown in FIG. 5 and the results obtained at 750° C are shown in FIG. 6.

In FIG. 5, curves (8), (9), and (10) stand for the purification ratios of nitrogen oxides when the reaction was carried out at a residence time of about 1 second and the concentration of acetonitrile was 920 ppm, 1,900 ppm, and 4,400 ppm, respectively, curve (11) stands for the purification ratio of the nitrogen oxides at a residence time of 0.52 second and at an acetonitrile concentration of 1,350 ppm, and curve (12) stands for the purification ratio of the nitrogen oxide at a residence time of 0.19 second and at an acetonitrile concentration of 1,250 ppm.

In FIG. 6, curve (13) stands for the purification ratio of nitrogen monoxide at a residence time of 1.1 second and an acetonitrile concentration of 1,030 ppm, curve (14) stands for the purification ratio of nitrogen monoxide at a residence time of 0.55 second and an acetonitrile concentration of 1,560 ppm, and curve (15) stands for the purification ratio of nitrogen monoxide at a residence time of 0.21 second and an acetonitrile concentration of 640 ppm.

The content of nitrogen monoxide was controlled at 200 ppm in each case. In this Example, a quartz tube having an inner diameter of 40 mm and a length of 50 cm was used as the reaction tube except that a quartz tube having an inner diameter of 21 mm and a length of 50 cm was used in the case of curves (12) and (15).

Furthermore, the decomposition of acetonitrile showed the same tendency as the purification ratio of nitrogen monoxide, and the purification ratio of acetonitrile was about 10% higher than that of nitrogen monoxide. That is, in the system where the purification ratio of nitrogen monoxide was lower than 20%, the decomposition of acetonitrile hardly occurred, and when the purification reaction of nitrogen monoxide proceeded, the decomposition of acetonitrile also proceeded. Still further, when the purification ratio of nitrogen monoxide was higher than 90%, the purification ratio of acetonitrile was 100% (no acetonitrile was detected in the treated gas).

COMPARISON EXAMPLE 1

The purification reaction was carried out in the absence of oxygen using the same reaction system as in Example 1.

Figure 7:
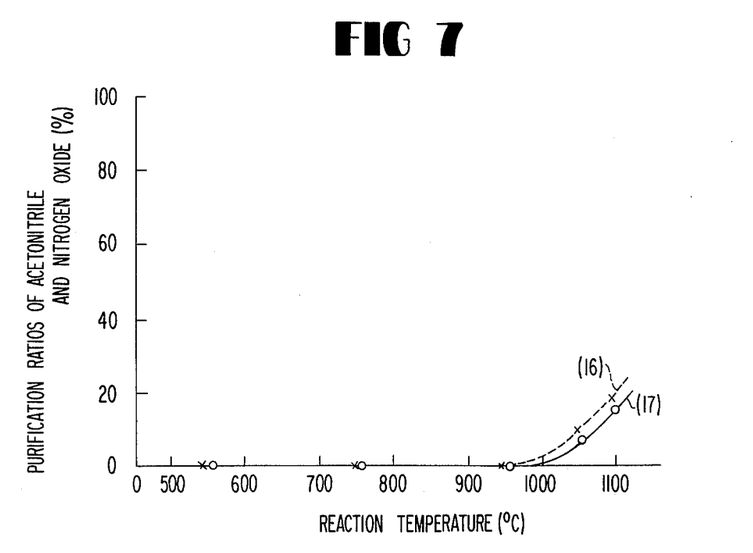
FIG. 7 is a graph showing the decomposition results of nitrogen oxides and acetonitrile in the absence of oxygen.

The results are shown in FIG. 7. The reaction was performed at a reaction temperature of 500° to 1,100° C and at a residence time of about 0.5 second at 800° C, and in the reaction the rates of feeding the gases were controlled so that the contents of acetonitrile and nitrogen monoxide became 600 ppm and 200 ppm, respectively.

In the graph, curve (16) stands for the purification ratio of acetonitrile and curve (17) stands for the purification ratio of nitrogen monoxide.

The results of FIGS. 5, 6 and 7 show that the presence of oxygen is indispensable to the decomposition reaction of nitrogen oxide using a nitrile compound. Also, the results show that the amount of oxygen depends upon the residence time, the reaction temperature, and the concentration of the nitrile compound. When an exhaust gas contains nitrile compounds beforehand, particular attention must be paid to the concentration of oxygen.

As is shown in FIG. 7, neither decomposition of the nitrile compound nor decomposition of nitrogen oxides occurred up to 1,000° C, but the decomposition reaction began to occur when the temperature was increased to over 1,000° C. The decomposition reaction thus is believed to be a non-selective reduction reaction of nitrogen oxides. Thus, it will be understood that higher temperatures are required for a non-selective reduction reaction while the selective reduction reaction of this invention proceeds at low temperatures.

EXAMPLE 5

By following the same procedure as in Example 1 using the same reaction system as in Example 1, the influence of the residence time in the reaction zone was examined.

The test was carried out while controlling the rates of feeding the gases so that the oxygen concentration, the nitrogen monoxide concentration, and the acetonitrile concentration were 3 to 4%, 200 ppm, and 600 ppm, respectively, while changing the flow rate of the gaseous mixture and the residence time.

Figure 8:
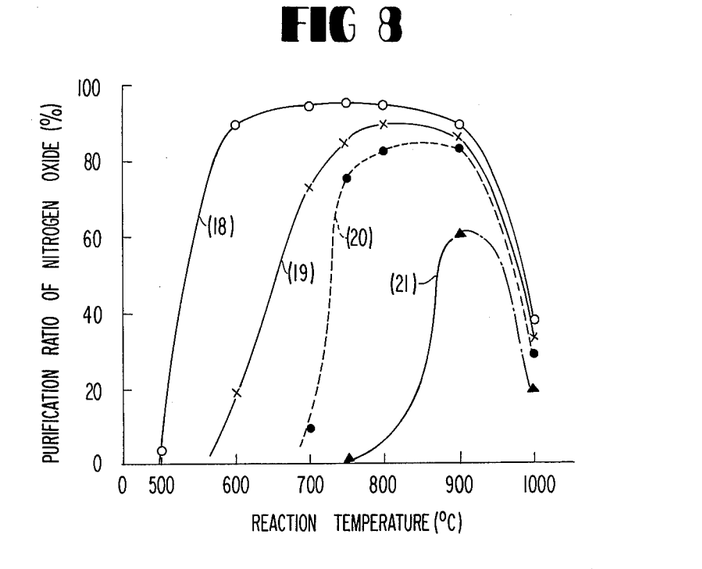
FIG. 8 is a graph showing the influence of the residence time.

The results are shown in FIG. 8, in which curves (18), (19), (20) and (21) stand for the cases of a residence time of 1.0 second, 0.7 second, 0.5 second, and 0.2 second, respectively, at 800° C. As the reaction tube, a quartz tube having an inner diameter of 40 mm and a length of 50 cm was used in the case of curves (18) and (20); one having an inner diameter of 34 mm and a length of 50 cm in the case of curve (19); and one having an inner diameter of 21 mm and a length of 50 cm in the case of curve (21), respectively.

The results show that as the residence time is longer, the temperature range becomes wider.

EXAMPLE 6

The reaction apparatus as was used in Example 1 was used in this Example. A boiler exhaust gas of C-heavy oil and nitrogen gas carrying 3.4% by volume acetonitrile were introduced into the preheating tube in the same fashion as in Example 1. The boiler exhaust gas was introduced at a rate of 3.9 to 4.0 l/min, and the nitrogen gas carrying 3.4% by volume acetonitrile was introduced at a rate of 60 to 65 ml/min such that the concentration of acetonitrile in the exhaust gas was 530 ppm. The reaction was then performed at a temperature of 780° C and at a residence time of 1.0 second. The boiler exhaust gas contained about 800 ppm sulfur dioxide, 250 ppm nitrogen monoxide and 3.2% oxygen, the remainder being carbon dioxide, water and nitrogen.

The concentration of nitrogen monoxide in the treated gas at the sampling outlet 17 of the reaction tube 15 was 12 ppm; acetonitrile was not detected in the treated gas.

This shows that the purification ratio of the nitrogen oxide was 95%, which coincides with the results in Example 1. The presence of the sulfur oxide had no influence on the purification reaction.

EXAMPLE 7

A reaction system as in Example 1 was also used in this Example. A gaseous mixture consisting of 1,300 ppm of nitrogen monoxide, 2.8% oxygen, 3% water, balance nitrogen, which approximates an exhaust gas from a nitric acid manufacturing factory, was supplied to the reaction system and 3,200 ppm of acetonitrile was added to the gaseous mixture to carry out the decomposition reaction at a residence time of 0.96 second and at a reaction temperature of 850° C.

The content of nitrogen monoxide at the sampling outlet 17 of the reaction tube was 58 ppm, and acetonitrile was not detected in the gaseous mixture.

EXAMPLE 8

The influences of hydrocarbons and carbon monoxide were tested using a reaction system the same as in Example 1.

A gaseous mixture having an oxygen concentration of 3%, a nitrogen monoxide concentration of 200 ppm, and an acetonitrile concentration of 700 ppm was subjected to the purification reaction at a residence time of about 0.7 second at 800° C in the presence of 0.1% propane or 0.2% carbon monoxide. In this Example, a quartz tube having an inner diameter of 34 mm and a length of 50 cm was used as the reaction tube.

Figure 9:
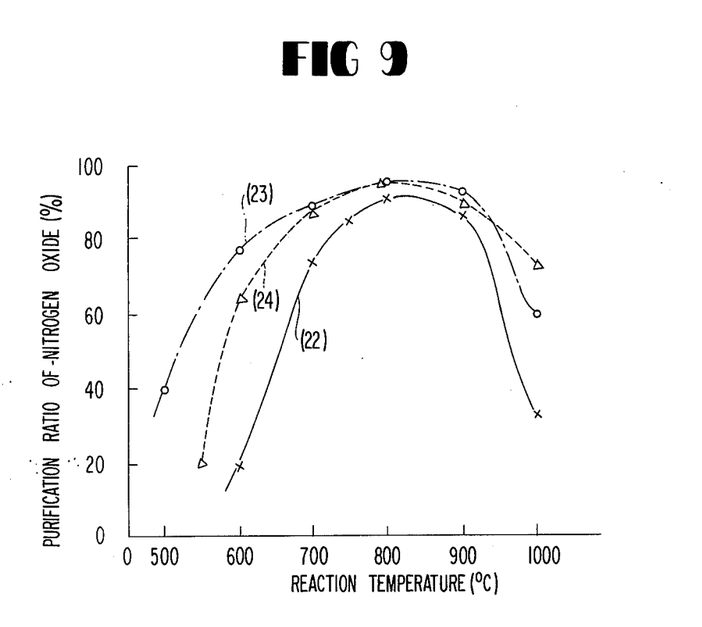
FIG. 9 is a graph showing the influence of the coexistence of hydrocarbons or carbon monoxide.

The results are shown in FIG. 9, in which curve 22 stands for the case of performing the reaction without propane or carbon monoxide, curve 23 stands for the case of performing the reaction in the presence of propane, and curve 24 stands for the case of performing the reaction in the presence of carbon monoxide.

The results show that when a hydrocarbon or an oxygen containing hydrocarbon are present in the exhaust gas, the hydrocarbon or the oxygen containing hydrocarbon has effect of improving the purification ratio or enlarging the temperature range.

EXAMPLE 9

A gaseous mixture was introduced into the reaction zone of the same reaction system as was used in Example 1 while controlling the composition of the gaseous mixture at 500 ppm of acetonitrile, 350 ppm of nitrogen monoxide, 0.3% propane, 0.8% carbon monoxide, 3.5% oxygen, 10% water, balance nitrogen gas, and the reaction was carried out at 780° C. In this Example, a quartz tube having an inner diameter of 40 mm and a length of 50 cm was used as reaction tube.

At the outlet of the reaction tube, only 25 ppm of nitrogen oxide and 10 ppm of carbon monoxide were detected; no acetonitrile was detected.

The residence time was 0.53 second.

COMPARISON EXAMPLE 2

The same procedure as in Example 9 was followed while the reaction temperature was changed to 1,050° C. In this case, 550 ppm of nitrogen oxide was detected but other harmful materials were not detected. The residence time was 0.42 second.

Thus, when the reaction temperature was over 1,000° C, the concentration of nitrogen oxide increased, which is considered to be due to the nitrile compound.

EXAMPLE 10

Figure 10:
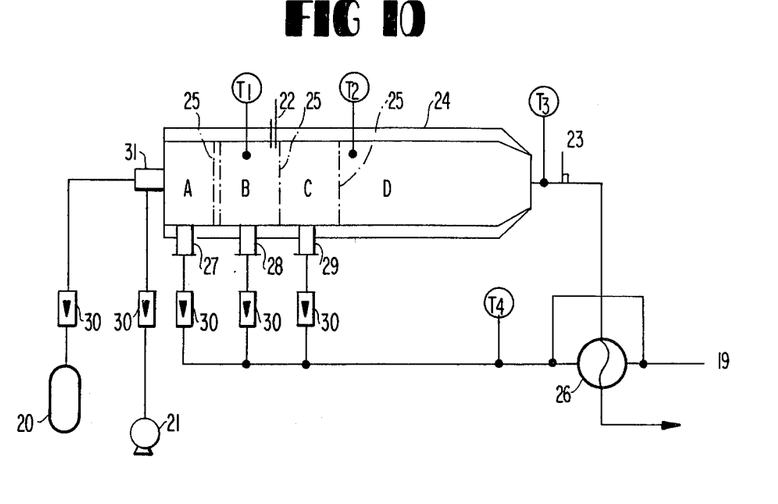
FIG. 10 is a flow sheet showing another embodiment of the method of this invention.

The apparatus illustrated in FIG. 10 was used in this Example. In FIG. 10, numerals 19, 20 and 21 represent, respectively, an inlet for an exhaust gas to be treated, a cylinder containing a combustion improver and an air blower to mix air with the combustion improver and numerals 22 and 23 show sampling outlets. Numeral 24 represents a furnace having an inner diameter of 350 mm and a length of 6 m composed of a high purity alumina refractory, in which plates 25 also composed of a high purity alumina refractory were provided (the plates used herein refer to those capable of converting turbulent flow into laminar flow). Furnace 24 was divided into sections A to D. The volume of section D was half of the whole volume of the furnace and the volumes of sections A, B and C were all equal. Numerals 30 and 31 represent a flow meter and a burner, respectively, and $T_1$ to $T_4$ represent thermometers. The exhaust gas to be treated was preheated by means of heat exchanger 26 and introduced into furnace 24 through exhaust gas inlets 27, 28 and 29. The combustion improver was introduced into the furnace from the cylinder 20 via burner 31, and air was introduced into the furnace via blower 21. The flow rates of the exhaust gas to be treated, the combustion improver and air were controlled by means of flow control valves (not shown) such that the predetermined composition could be obtained.

In this Example, propane was used as the combustion improver and it was introduced with the air into the furnace via burner 31 to perform the combustion. The temperature of section C was adjusted to be 730° C. In this case, the flow rates of the combustion improver and air were 0.78 to 0.8 $Nm^3/hr$ and 74 to 75 $Nm^3/hr$, respectively. 60 ppm of nitrogen oxide and 15.6% of oxygen were detected at the sampling outlet 22.

Thereafter, an exhaust gas from a petrochemical process having the composition as shown in Table 2 (preheated to 200° C) was introduced into the section C from the inlet 29 at a rate of 140 $Nm^3/hr$. Combustion started in section C and the temperature of section D became 850° C for the thermometer $T_2$ and 760° C for the thermometer $T_3$, respectively. 5 ppm of nitrogen oxide, 0.1 ppm of hydrogen cyanide and 1.1 ppm of carbon monoxide were detected at the sampling outlet 23 but propane and acetonitrile were not detected. The content of oxygen was 4.7%, and, the residence time in the section D was calculated to be 1.2 seconds calculated as the mean temperature being 805° C.

TABLE 2

| | |
|---|---|
| HCN | 8.5 ppm |
| $CH_3CN$ | 940 ppm |
| NO | 180 ppm |
| $C_3H_8$ | 6,900 ppm |
| CO | 15,400 ppm |
| $CO_2$ | 2.91% |
| $H_2O$ | 7.05% |
| $O_2$ | 2.8% |
| $N_2$ | balance |

COMPARISON EXAMPLE 3

The exhaust gas to be treated was introduced into section A of the combustion furnace as in Example 10 instead of being introduced into section C as in Example 10, whereby the temperature of section B became 880° C and that of the section D became 860° to 770° C. At the sampling outlet 26, 0.5 ppm of hydrogen cyanide and 470 ppm of nitrogen oxides were detected.

EXAMPLE 11

The exhaust gas having the composition shown in Table 2 was introduced into a furnace as in Example 10 through sections A, B, and C in equal amounts, 47 Nm³/hr, to each section and then the gas was subjected to combustion by controlling the amount of the combustion improver, propane, supplied so that the temperature in section D became 780° C at the outlet portion. Furthermore, the combustion was performed in such a manner that the oxygen content in the gas at the sampling outlet 23 of the furnace became 3%. In this case, the flow rates of propane and air were 0.5 Nm³/hr and 40 Nm³/hr, respectively, and each temperature of $T_1$ and $T_2$ was 870° C. In this case, at the sampling outlet 23 of the furnace, 1.2 ppm of hydrogen cyanide, and 15 ppm of nitrogen oxides were detected but no other harmful materials were detected.

The residence time in section D was about 1.4 seconds.

As is clear from the foregoing results, in this Example the amount of the combustion improver used can be reduced to about 40% as compared with Example 11, and, moreover, by a multistage combustion further economically advantageous operation becomes possible.

EXAMPLE 12

Figure 11:
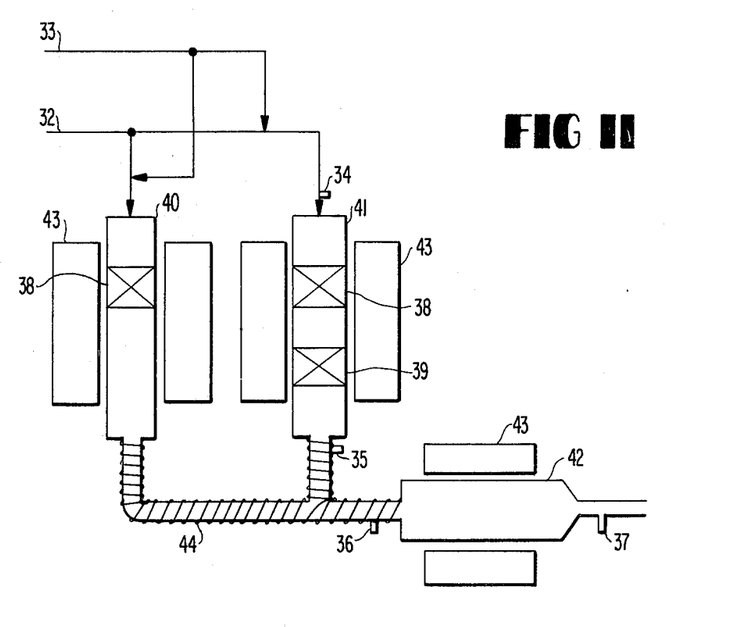
FIG. 11 is a flow sheet showing still another embodiment of the method of this invention.

The reaction was carried out using the reaction system illustrated in FIG. 11. The reaction system was composed of, as shown in FIG. 11, a pair of Pyrex tubes 40 and 41 each having a 33 mm inner diameter and a 55 cm length and a quartz reaction tube 42 of a 40 mm inner diameter and a 50 cm length, tube 40 having a preheating section 38, another tube 41 having a preheating section 38 and a catalyst layer 39, the whole system being equipped with sampling outlets 34, 35, 36 and 37. The tubes were disposed in an electric furnace 43. Also shown in FIG. 11 is ribbon heater 44 which encloses the outlets from Pyrex tubes 40 and 41 in the area intermediate these tubes and the quartz reaction tube 42. An exhaust gas to be treated was introduced via conduit 32 and air was introduced via conduit 33 into the reaction system.

A commercially available platinum-alumina catalyst (globular alumina of 4 to 6 mm in diameter containing about 1% by weight platinum) was used in an amount of 40 cc as the catalyst layer. About 40% by volume of the exhaust gas having a composition as shown by sampling outlet number 32 in Table 3 below and air were introduced into the catalyst containing tube 41 at rates of 2.3 ± 0.1 l/min and 0.7 ± 0.05 l/min, respectively, and reacted at a temperature of 330° C (at the inlet side of the catalyst layer) at a space velocity of about 50,000 hr⁻¹ and at normal pressure. The remaining 60% by volume of the exhaust gas and air were introduced into the other tube 40 at rates of 3.4 ± 0.1 l/min and 0.9 ± 0.05 l/min, respectively and preheated, and then combined with the gas passed through the catalyst layer.

The combined gas was then introduced into quartz reaction tube 42 to carry out the combustion reaction at 780° C.

In this case, the residence time in the quartz reaction tube was 0.53 second. The results are shown in Table 3, in which sampling outlets 34 to 37 correspond to those in FIG. 11.

In the table, the figures shown in the parentheses were obtained by balance calculations, etc.

TABLE 3

| Composition | | 32 | 34 | 35 | 36 | 37 |
|---|---|---|---|---|---|---|
| $CH_3CN$ | ppm | 1,000 | (760) | 150 | (530) | 0 |
| NO | ppm | 200 | 150 | 650 | (360) | 25 |
| $NH_3$ | ppm | 0 | — | 0 | — | 0 |
| $C_3H_6$ | ppm | 2,000 | (1,520) | 0 | (930) | 0 |
| $C_3H_8$ | ppm | 5,000 | (3,800) | 600 | (2,580) | 0 |
| CO | ppm | 15,000 | (11,400) | 1,500 | (7,600) | 10 |
| $CO_2$ | % | 3.0 | — | — | — | — |
| $O_2$ | % | 0 | 5.0 | 2.1 | (3.5) | 1.3 |
| $H_2O$ | % | 7.0 | — | — | — | — |
| $N_2$ | | Balance | — | — | — | — |

EXAMPLE 13

The same procedure as in Example 12 was followed while reducing the oxygen concentration at the sampling outlet 34. In this Example, the composition and flow rate of the exhaust gas used which was introduced into the catalyst containing tube 41 and the other tube 40 were the same as in Example 12, but the amounts of air supplied were changed to 0.4 ± 0.05 l/min for the tube 41 and 1.1 ± 0.05 l/min for the tube 40, respectively.

TABLE 4

| Composition | | 32 | 34 | 35 | 36 | 37 |
|---|---|---|---|---|---|---|
| $CH_3CN$ | ppm | 1,000 | (860) | 270 | (580) | 3 |
| NO | ppm | 200 | 170 | 4 | (98) | 6 |
| $NH_3$ | ppm | 0 | — | 480 | (180) | 0 |
| $C_3H_6$ | ppm | 2,000 | (1,710) | 0 | (960) | 0 |
| $C_3H_8$ | ppm | 5,000 | (4,300) | 600 | (2,620) | 0 |
| CO | ppm | 15,000 | (12,900) | 8,500 | (10,400) | 7 |
| $CO_2$ | % | 3.0 | — | — | — | — |
| $O_2$ | % | 0 | 3.0 | 0 | (3.1) | 0.7 |
| $H_2O$ | % | 7.0 | — | — | — | — |
| $N_2$ | | Balance | — | — | — | — |

EXAMPLE 14

Following the procedure of Example 12, all of the air 33 was introduced into the catalyst bearing tube 41 and the reaction was carried out under the same conditions as in Example 12. The results are shown in Table 5.

TABLE 5

| Composition | | 32 | 34 | 35 | 36 | 37 |
|---|---|---|---|---|---|---|
| $C_3H_3CN$ | ppm | 1,000 | (570) | 50 | (490) | 0 |
| NO | ppm | 200 | 115 | 485 | (350) | 27 |
| $NH_3$ | ppm | 0 | — | 0 | — | 0 |
| $C_3H_6$ | ppm | 2,000 | (1,150) | 0 | (920) | 0 |
| $C_3H_8$ | ppm | 5,000 | (2,860) | 250 | (2,440) | 0 |
| CO | ppm | 15,000 | (8,570) | 730 | (7,320) | 0 |
| $CO_2$ | % | 3.0 | — | — | — | — |
| $O_2$ | % | 0 | 9.0 | 6.6 | (3.55) | 1.4 |
| $H_2O$ | % | 7.0 | — | — | — | — |
| $N_2$ | | Balance | — | — | — | — |

From the results in Examples 12, 13, and 14, it is clear that the content of nitrogen oxides in the treated gas was less than 30 ppm, nitrile compound, hydrogen cyanide, carbon monoxide, etc., were hardly detected, and thus a very high purification ratio was obtained in each case.

While the invention has been described in detail and with reference to specific embodiments thereof, it will be apparent to one skilled in the art that various changes and modifications can be made therein without departing from the spirit and scope thereof.

What is claimed is:

1. A method of removing nitrogen oxides from an exhaust gas containing them which comprises contacting the exhaust gas with a nitrile compound in the presence of oxygen at a temperature of about 500° to about 1,000° C and a residence time of more than about 0.1 second without using a solid catalyst to decompose the nitrogen oxides and the nitrile compound into harmless components.

2. The method as claimed in claim 1, wherein said nitrile compound is a hydrocarbon having at least one CN group.

3. The method as claimed in claim 2, wherein said compound is a saturated or unsaturated aliphatic nitrile, a saturated or unsaturated aliphatic polynitrile, or an aromatic nitrile.

4. The method as claimed in claim 1, wherein said nitrile compound is acetonitrile.

5. The method as claimed in claim 1, wherein the molar ratio of the nitrile compound to nitrogen oxide is greater than about 0.5.

6. The method as claimed in claim 1, wherein the concentration of oxygen in the reaction system is greater than 0.3%.

7. The method as claimed in claim 1, wherein the residence time in the reaction system is above 0.5 second.

8. The method as claimed in claim 1, wherein said exhaust gas is a boiler exhaust gas.

9. The method as claimed in claim 1, wherein said exhaust gas is an exhaust gas from a nitric acid manufacturing factory.

10. The method as claimed in claim 1, wherein said exhaust gas contains hydrocarbons and oxygen containing hydrocarbons together with nitrogen oxide.

11. The method as claimed in claim 1, wherein said exhaust gas contains a nitrile compound together with nitrogen oxide.

12. The method as claimed in claim 1, wherein the exhaust gas is an exhaust gas containing the nitrile compound having been pretreated by being partially burned prior to processing.

13. The method as claimed in claim 12, wherein said burning of the exhaust gas is performed by dividing the exhaust gas into at least two streams and burning the divided streams using a combustion improver.

14. The method as claimed in claim 12, wherein said burning pretreatment of the exhaust gas is performed by dividing a flow of an exhaust gas into at least two streams and contacting one stream with a catalyst while heating.

15. The method as claimed in claim 14, wherein said catalyst is a noble metal catalyst comprising platinum or a catalyst composed of at least one oxide of nickel, chromium, cobalt, iron, vanadium, copper, or silver.

16. The method as claimed in claim 14, wherein said catalyst is a platinum-alumina catalyst.

17. The method as claimed in claim 3, wherein said nitrile compound is selected from the group consisting of acetonitrile, propionitrile, butyronitrile, acrylonitrile, methacrylonitrile, crotononitrile, malonitrile, succinonitrile, adiponitrile, fumaronitrile, maleonitrile, benzoitrile, tolunitrile or benzyl cyanide.

* * * * *